UNITED STATES PATENT OFFICE.

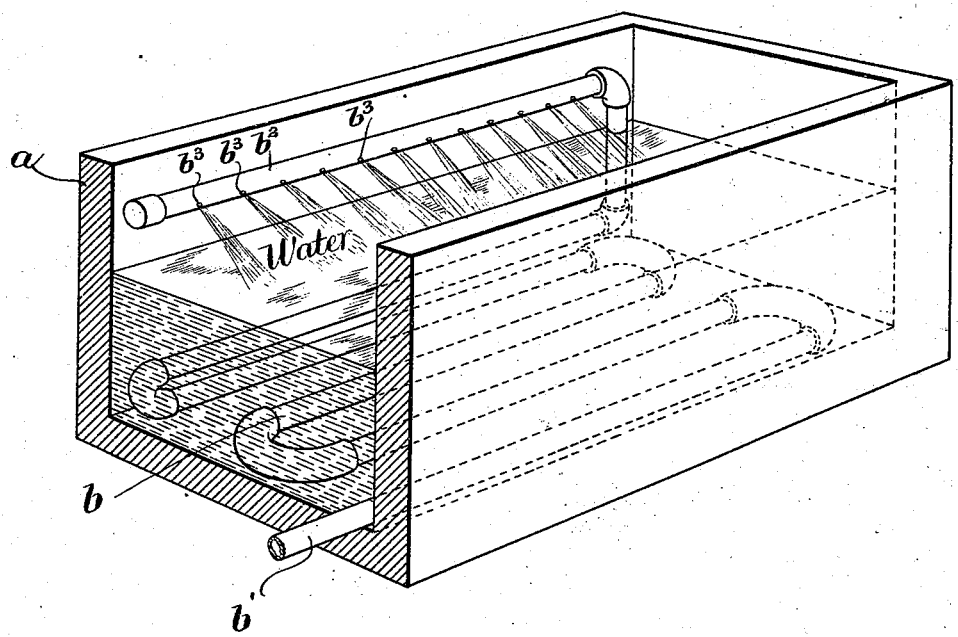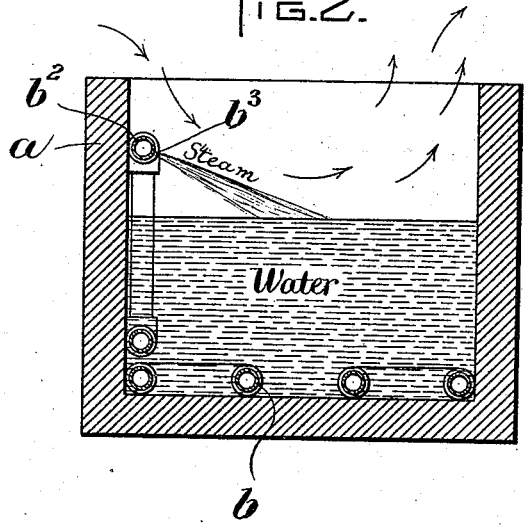

EDWARD WADE, OF LAWRENCE, MASSACHUSETTS.

AIR-MOISTENING APPARATUS.

SPECIFICATION forming part of Letters Patent No. 548,898, dated October 29, 1895.

Application filed March 29, 1895. Serial No. 543,626. (No model.)

*To all whom it may concern:*

Be it known that I, EDWARD WADE, of Lawrence, in the county of Essex and State of Massachusetts, have invented certain new and useful Improvements in Air-Moistening Apparatus, of which the following is a specification.

This invention has for its object to provide a simple and effective apparatus for moistening air in factories and other places where a certain degree of moisture is desirable for the proper performance of certain operations, such as weaving.

The invention consists in an air-moistening apparatus comprising as a whole an open tank adapted to contain a body of water, means for heating the water in the tank, and means for discharging jets of steam into the tank above the surface of the water to induce a circulation of air over the water, the heating of the water causing evaporation, while the steam which is partially condensed when discharged is additionally condensed and causes a sufficient movement of air to carry the moisture from the surface of the water and diffuse it through the room.

Of the accompanying drawings, forming a part of this specification, Figure 1 represents a perspective view showing an apparatus embodying my invention, one end of the tank being broken away. Fig. 2 represents a tranverse section of the tank.

The same letters of reference indicate the same parts in both the figures.

In the drawings, $a$ represents a horizontal tank adapted to contain a body of water and open at its upper portion. Means are provided for heating the water in the tank to cause sufficiently rapid evaporation from the water. Means are also provided for discharging numerous jets of steam into the upper portion of the tank above the surface of the water. I prefer to combine the heating means and steam-discharging means in one structure, which, as here shown, comprises a steam-coil $b$ communicating at one end with a steam-supply pipe $b'$, said coil being disposed upon the bottom of the tank, and an elevated pipe $B^2$, constituting a continuation of the coil and arranged in the upper portion of the tank above the body of water therein, said elevated pipe having a series of perforations $b^3$, through which the steam that enters the pipe $b^2$ is discharged in numerous jets into the upper portion of the tank above the surface of the water therein. I prefer to arrange the orifices $b^3$ so that the jets of steam will be discharged downwardly and will impinge upon the surface of the water, as indicated in Fig. 2.

It will be seen that portions of the water are evaporated by the action of the steam-coil, and that the steam escaping from said coil through the orifices induces a circulation of air, which enters the tank, takes up the moisture arising from the water, and passes out of the tank, diffusing the moisture through the room, as indicated by the arrows in Fig. 2, the moisture contained in the steam discharged from the pipe $b^2$ being added to that evaporated from the water.

I do not limit myself to making the heating means and the steam-discharging means in one structure, as I may employ an independent pipe for discharging steam into the upper portion of the tank. I prefer the construction shown, however, on account of its convenience, simplicity, and economy.

I claim—

1. An air-moistening apparatus comprising an open tank adapted to contain a body of water, and means for discharging jets of steam into the tank above the surface of the water to induce a circulation of air over the water.

2. An air-moistening apparatus comprising an open tank adapted to contain a body of water, means for heating the water, and means for discharging jets of steam into the tank above the surface of the water to induce a circulation of air over the water.

3. An air-moistening apparatus comprising an open tank and a steam conduit within the tank, a portion of said conduit being located near the bottom of the tank to heat a body of water therein, while another portion is located near the top of the tank and provided with numerous outlets arranged to discharge jets of steam above said body of water and thereby induce a circulation of air over the surface of the water.

In testimony whereof I have signed my name to this specification, in the presence of two subscribing witnesses, this 23d day of March, A. D. 1895.

EDWARD WADE.

Witnesses:
C. F. BROWN,
A. D. HARRISON.